United States Patent Office 3,631,183
Patented Dec. 28, 1971

3,631,183
CYCLOALIPHATIC BIS(AZIDOFORMATE)S
David S. Breslow, Wilmington, Del., assignor to Hercules Incorporated, Wilmington, Del.
No Drawing. Continuation-in-part of application Ser. No. 418,278, Dec. 14, 1964, which is a continuation-in-part of applications Ser. No. 172,815, Feb. 12, 1962, and Ser. No. 247,878, Dec. 28, 1962. This application May 21, 1970, Ser. No. 39,522
Int. Cl. C07c *117/00*
U.S. Cl. 260—349      6 Claims

ABSTRACT OF THE DISCLOSURE

Cyclohexane bis(azidoformate)s and cyclohexane bis (methylene azidoformate)s are described. These products are useful as cross-linking agents for various polymers, particularly polyolefins.

---

This application is a continuation-in-part of my application U.S. Ser. No. 418,278, filed Dec. 14, 1964, which is in turn a continuation-in-part of my application U.S. Ser. No 172,815, filed Feb 12, 1962, now U.S. Pat. No. 3,211,752, and of my application U.S. Ser. No. 247,878, filed Dec. 28, 1962, now abandoned.

This invention relates to poly(azidoformate)s, which compounds are new agents useful for cross-linking polymers.

In the past, industry has depended almost entirely upon sulfur or sulfur-bearing materials as vulcanizing, i.e., cross-linking agents. It has more recently been discovered that certain types of organic peroxides or azo compounds are capable of acting as vulcanizing agents. However, all of the above agents suffer the drawback that because of their mode of action they are not equally effective in cross-linking all types of polymers. For example, polybutadiene is effectively vulcanized by peroxides while butyl rubber and crystalline polypropylene are not.

Now in accordance with this invention, it has unexpectedly been found that a number of polymers can be cross-linked by non-volatile azidoformate compounds to produce vulcanizates that are tough, resilient, solvent resistant, and odor free. In addition, it has been found that the polymers can be treated with smaller amounts of the azidoformates to improve their properties without materially affecting their solubility.

The new azidoformates of this invention are solids or oils having the general formula

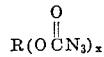

where $x$ is at least 2, preferably from 2 to 4, and R is an organic radical, inert to cross-linking reactions, containing at least one carbon atom per azidoformate group, the azidoformate groups being attached to different carbon atoms in said R group. Exemplary of the new azidoformates of this invention are those compounds having the above formula wherein R is a hydrocarbon radical of 6 to 8 carbon atoms and contains a cyclohexylene group, as for example in cyclohexylene-1,2-bis(azidoformate), cyclohexylene - 1,3-bis(azidoformate), cyclohexylene-1,4-bis(azidoformate), 1,2 - cyclohexane-dimethyl bis(azidoformate), 1,3-cyclohexane-dimethyl bis(azidoformate), and 1,4-cyclohexane-dimethyl bis(azidoformate). Most of these azidoformates are relatively insensitive to impact and are sweet-smelling, colorless solids or oils. Especially preferred for use in modifying and cross-linking polymers are those azidoformates having a boiling point of at least about 100° C. at a pressure of 70 mm. of mercury.

The azidoformates of this invention can be prepared in various ways, as for example, by reacting a chloroformate with an excess, i.e., from about 1.05 moles to about 10 moles per equivalent of chloroformate, of an alkali azide. This reaction can be shown by the following equation

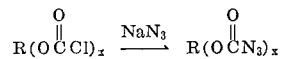

where R and $x$ are as defined above. The chloroformates are well known materials whose preparation is described in the chemical literature. Before describing the invention in greater detail, the following examples are presented to illustrate the preparation of the new azidoformates, all parts and percentages being by weight unless otherwise indicated.

EXAMPLE 1

The chloroformate of 1,4-cyclohexanedimethanol was prepared by adding the diol (144 parts) to excess phosgene at 0° C. (230 parts). The product was a semi-solid and was obtained in a 95% yield.

To a solution of 13 parts of sodium azide in about 30 parts of water was added at room temperature 13.5 parts of the 1,4-cyclohexanedimethyl bis(chloroformate) dissolved in about 60 parts of chloroform. After stirring at room temperature, the product was isolated by separating the chloroform layer, washing it with water and, after drying over magnesium sulfate and sodium sulfate, removing the chloroform under vacuum. The 1,4-cyclohexanedimethyl bis(azidoformate) was obtained in a 95% yield and by nitrogen evolution was shown to be 97% pure. It was a colorless solid which on recrystallization from methylene chloride—pentane had a melting point of 91–93° C. On analysis, it was found to contain 42.9% C, 54.% H, 28.4% N, and 21.1% O (theoretical values are 42.55% C, 5.00% H, 29.78% N, and 22.67% O).

EXAMPLE 2

A solution of 28.8 parts of 1,3-cyclohexanedimethanol in 250 parts methyl isobutyl ketone was cooled at 0° C. while passing in 0.6 mole phosgene. After stirring for 3 hours at 2° C. and 5 hours at room temperature, the reaction mixture was rapidly sparged with nitrogen to remove dissolved gases. This solution of the bis(chloromate) was added to a solution of 26 parts of sodium azide in 100 parts of water. The reaction mixture was rapidly stirred at 50° C. for 4 hours, then cooled to room temperature and washed with water three times. The solvent was removed under aspirator vacuum whereby there was obtained 54 parts of the desired 1,3-bis(azidocarbonyloxymethyl) cyclohexane, another name for which is 1,3-cyclohexanedimethyl bis(azidoformate). An infrared spectrum showed the product to have the desired strong carbonyl absorption at 1735 cm.$^{-1}$ and the azide band at 2130 cm.$^{-1}$. Analysis for nitrogen showed it to contain 29.5% nitrogen (theoretical percent nitrogen is 29.8).

EXAMPLE 3

A solution of 90 parts phosgene in 200 parts of methylene chloride was cooled at −5° C. while adding 34.8 parts 1,3-cyclohexanediol. After stirring for 3 hours at +3° C., the reaction was warmed to 20° C. and stirring was continued for an additional four hours. The solution was refluxed gently to remove the dissolved gases and then added to a rapidly stirred slurry of 78 parts of sodium azide, 200 parts of $H_2O$ and 100 parts of acetone. After stirring, the reaction mixture was heated at reflux for 7 hours. The solution of the bis(azidoformate) was then washed with water and dried over magnesium sulfate. The product so obtained, after removal of the solvents, amounted to a 96% yield of 1,3-cyclohexane bis (azidoformate). The infrared spectrum showed a strong azide band at 2130 cm.$^{-1}$. On analysis, it was found to contain 32.6% nitrogen (theoretical value is 33.1% nitrogen).

Any type of hydrocarbon polymer, including saturated, unsaturated, linear atactic, crystalline, or nonlinear amorphous polymers, as for example, polyethylene, polypropylene, polystyrene, styrene—butadiene rubber, butyl rubber, natural rubber, polybutadiene, polyisobutylene, ethylene—propylene copolymer, cis-1,4-polyisoprene, ethylene—propylene—dicyclopentadiene terpolymer, etc., and blends of these polymers with each other or nonhydrocarbon polymers can be cross-linked with any of the new azidoformates provided it has a boiling point of at least about 100° C. at a pressure of 70 mm. of mercury. In addition to the hydrocarbon polymers, a larger number of nonhydrocarbon polymers can also be cross-linked with the new azidoformates. Typical of the nonhydrocarbon polymers that can be cross-linked in accordance with this invention are the cellulose esters such as cellulose acetate butyrate, the cellulose partial alkyl ethers such as hydroxyethyl and hydroxyproyl cellulose, chlorinated natural rubber, sulfochlorinated polyethylene, poly(vinyl acetate), poly(vinyl chloride), poly(vinylidene chloride), poly (ethyl acrylate), poly(ethylene oxide), poly[3,3-bis (chloromethyl) oxetane], vinyl modified polydimethyl siloxane, polychloroprene, butadiene—acrylonitrile copolymer, etc., and blends of these polymers with each other or hydrocarbon polymers.

The cross-linking process can be carried out by heating the polymer plus the azidoformate compound above its decomposition temperature. This temperature varies over a wide range, but in general, will be in the range of from about 70° C. to 350° C. Various amounts of cross-linking agent can be added, the optimum amount depending on the amount of cross-linking desired, the specific azidoformate compound employed, etc. For example, in some cases, such as in certain film applications, it may be desirable to merely add a sufficient amount of azidoformate compound to strengthen the polymer without materially affecting its solubility. In general, the amount added, based on the weight of the polymer, will be from about 0.01% to about 20%. In some cases, it may be desirable to add a small amount, i.e., from about 0.01% to about 1.0%, of sulfur, which seems to act as a co-agent for the azidoformates.

The cross-linking agent can be incorporated in the polymer in any desired fashion; for example, it can be uniformly blended by simply milling on a conventional rubber mill or dissolved in a solution containing the polymer. By either means, the azidoformate compound is distributed throughout the polymer and uniform cross-linking is effected when the blend is subjected to heat. Other means of mixing the cross-linking agent with the polymer will be apparent to those skilled in the art.

In addition to the cross-linking agent, other ingredients can also be incorporated. The additives commonly used in rubber vulcanizates can be used here also, as for example, extenders, fillers, pigments, plasticizers, stabilizers, etc. Exemplary of the fillers that can be added are calcium carbonate, iron oxide, carbon black, silica, calcium silicate (hydrated), alumina, etc. The presence of a filler, and in particular carbon black, is beneficial and, as in rubber compounding, gives optimum results. Obviously, there are many cases in which a filler is not required or desired, and excellent results are achieved when only the cross-linking agent is added.

The following example is presented to illustrate the use of the new azidoformates for cross-linking polymers with parts and percentages being by weight unless otherwise specified. The extent of cross-linking is determined by analysis for percent gain in insolubility in solvents in which the uncross-linked polymer was soluble and for the degree of swell therein, hereinafter termed "percent gel" and "percent swell." Percent gel is indicative of the percentage of polymer that is cross-linked and percent swell is inversely proportional to the cross-link density. Percent gel and swell are determined as follows: A weighed sample of cross-linked polymer is soaked in a solvent, in which the uncross-linked polymer was soluble, at an elevated temperature for a specified length of time. The sample is then removed, blotted on filter paper so as to remove the solvent on the surface and weighed at once. The swollen sample is then dried to constant weight. The weights of initial and final sample are corrected for polymer and copolymer content based on knowledge of components. From these figures.

$$\frac{\text{Corrected dry weight}}{\text{Corrected initial weight}} \times 100 = \text{percent gel}$$

$$\frac{\text{Corrected swollen weight} - \text{corrected dry weight}}{\text{Corrected dry weight}} \times 100 \text{ percent swell}$$

The molecular weight of the polymer cross-linked in the example is indicated by its Reduced Specific Viscosity (RSV). By the term "Reduced Specific Viscosity" is meant the $\eta_{sp}/c$ determined on a 0.1% solution (0.1 g. of the polymer per 100 ml. of solution) of the polymer at elevated temperature.

EXAMPLE 4

A sample of an ethylenepropylene copolymer, containing 30 mole percent propylene and having an RSV of 2.1, as determined in decahydronaphthalene at a temperature of 135° C., was cross-linked with 1,4-cyclohexanedimethyl-bis-(azidoformate). The following ingredients were compounded on a two-roll mill at a temperature of 38° C. for 30 minutes.

| Ingredients: | Parts |
|---|---|
| Ethylene—propylene copolymer | 100 |
| High abrasion furnace black | 50 |
| 1,4 - cyclohexanedimethyl-bis(azidoformate) | |
| Polymerized trimethyl dihydroquinoline (antioxidant) | 0.5 |
| Sulfur | 0.175 |

The resulting mixture can cured in a closed iron mold at a temperature of 150° C. for 30 minutes. The properties of the vulcanizate were as follows:

| | |
|---|---|
| Tensile strength, p.s.i. | 2250 |
| Modulus at 300% elongation, p.s.i. | 1460 |
| Elongation, percent | 415 |
| Shore A hardness | 69 |
| Break set, percent | 15 |

What I claim and desire to protect by Letters Patent is:
1. An azidoformate having the formula

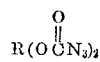

where R is a saturated hydrocarbon radical having the formula

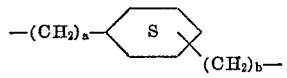

wherein $a$ and $b$ are each zero or one, the azidoformate groups being attached to different carbon atoms in said R.

2. The product of claim 1 where R is cyclohexylenedimethylene.
3. The product of claim 1 where R is cyclohexylene.
4. 1,4-cyclohexane-bis(methylene azidoformate).
5. 1,3-cyclohexane-bis(methylene azidoformate).
6. 1,3-cyclohexane-bis(azidoformate).

References Cited

UNITED STATES PATENTS

| 3,211,752 | 10/1965 | Breslow | 260—349 |
| 3,324,148 | 6/1967 | Cotter | 260—349 |
| 3,360,513 | 12/1967 | Cotter | 260—349 X |
| 3,369,030 | 2/1968 | MacArthur | 260—349 |

JOHN M. FORD, Primary Examiner

U.S. Cl. X.R.

260—94.6

PO-1050
(5/69)

UNITED STATES PATENT OFFICE
CERTIFICATE OF CORRECTION

Patent No. U.S.P. 3,631,183          Dated December 28, 1971

Inventor(s) David S. Breslow (Case 22-26-33-52)

It is certified that error appears in the above-identified patent and that said Letters Patent are hereby corrected as shown below:

ol. 2, Line 41 of p.p.; Page 4, Line 12 of spec.
"54.%H"   -- should be --   "5.4%H"

ol. 2, Line 50 of p.p.; Page 4, Line 2o of spec.
"(chloromate)'   -- should be --  "(chloroformate)"

ol. 4, Line 54 of p.p.; Page 8, Line 14 of spec.
opposite 1,4 - cyclo..... "2"  should be added ol. 4, Line 59 of p.p.; Page 8, Line 18 of spec.
"can"   -- should be '"was"

Signed and sealed this 8th day of August 1972.

(SEAL)
Attest:

EDWARD M. FLETCHER, JR.          ROBERT GOTTSCHALK
Attesting Officer                Commissioner of Patents